(12) United States Patent
Ma et al.

(10) Patent No.: US 10,855,353 B2
(45) Date of Patent: *Dec. 1, 2020

(54) SYSTEM AND METHOD FOR DOWNLINK CHANNEL SOUNDING IN WIRELESS COMMUNICATIONS SYSTEMS

(71) Applicant: Huawei Technologies Co., Ltd., Shenzhen (CN)

(72) Inventors: Jianglei Ma, Ottawa (CA); Peiying Zhu, Kanata (CA); Wen Tong, Ottawa (CA); Ming Jia, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/265,653

(22) Filed: Feb. 1, 2019

(65) Prior Publication Data
US 2019/0165845 A1    May 30, 2019

Related U.S. Application Data

(63) Continuation of application No. 15/650,473, filed on Jul. 14, 2017, which is a continuation of application
(Continued)

(51) Int. Cl.
*H04B 7/06* (2006.01)
*H01Q 25/00* (2006.01)
(Continued)

(52) U.S. Cl.
CPC .......... *H04B 7/0617* (2013.01); *H01Q 25/00* (2013.01); *H04B 7/024* (2013.01); *H04B 7/0456* (2013.01);
(Continued)

(58) Field of Classification Search
CPC .... H04B 7/0617; H04B 7/024; H04B 7/0456; H04B 7/0632; H04B 7/0639; H01Q 25/00
See application file for complete search history.

(56) References Cited

U.S. PATENT DOCUMENTS 7,573,851 B2    8/2009    Xing et al.
8,072,946 B2 *  12/2011   Li ..................... H04W 28/18
                                                370/338
(Continued)

FOREIGN PATENT DOCUMENTS

CN    101453259 A    6/2009
CN    101478337 A    7/2009
(Continued)

OTHER PUBLICATIONS

3rd Generation Partnership Project; Technical Specification Group Radio Access Network; Further Advancements for E-UTRA Physical Layer Aspects (Release 9), Technical Report, 3GPP TR 36.814 v1.1.1, Jun. 2009, 39 pages.
(Continued)

*Primary Examiner* — Chi H Pham
*Assistant Examiner* — Weibin Huang
(74) *Attorney, Agent, or Firm* — Slater Matsil, LLP (57) ABSTRACT

In accordance with an embodiment, a method of operating a base station configured to communicate with at least one user device includes transmitting a reference signal to the at least one user device, receiving channel quality information from the at least one user device, and forming a beam based on the channel quality information received from the at least one user device.

20 Claims, 7 Drawing Sheets

Related U.S. Application Data

No. 14/874,190, filed on Oct. 2, 2015, now Pat. No. 9,735,852, which is a continuation of application No. 12/830,983, filed on Jul. 6, 2010, now Pat. No. 9,184,511.

(60) Provisional application No. 61/224,737, filed on Jul. 10, 2009.

(51) Int. Cl.
| | | |
|---|---|---|
| *H04B 7/024* | (2017.01) | |
| *H04B 7/0456* | (2017.01) | |
| *H04W 8/24* | (2009.01) | |
| *H04W 48/08* | (2009.01) | |
| *H04W 88/08* | (2009.01) | |

(52) U.S. Cl.
CPC ......... *H04B 7/0632* (2013.01); *H04B 7/0639* (2013.01); *H04W 8/24* (2013.01); *H04W 48/08* (2013.01); *H04W 88/08* (2013.01)

(56) References Cited

U.S. PATENT DOCUMENTS

| | | | |
|---|---|---|---|
| 8,089,911 B2 | 1/2012 | Huang et al. | |
| 8,229,017 B1* | 7/2012 | Lee | H04B 7/0665 375/267 |
| 8,265,629 B2 | 9/2012 | Kwon et al. | |
| 8,582,672 B2 | 11/2013 | Sanayei | |
| 8,737,307 B2 | 5/2014 | Kim et al. | |
| 9,184,511 B2 | 11/2015 | Ma et al. | |
| 9,735,852 B2 | 8/2017 | Ma et al. | |
| 10,498,416 B2* | 12/2019 | Ma | H01Q 25/00 |
| 2006/0276229 A1* | 12/2006 | Braun | H04W 16/28 455/562.1 |
| 2007/0099578 A1* | 5/2007 | Adeney | H04B 7/0689 455/69 |
| 2007/0099666 A1* | 5/2007 | Astely | H04B 7/0632 455/562.1 |
| 2008/0108310 A1 | 5/2008 | Tong et al. | |
| 2008/0144737 A1* | 6/2008 | Naguib | H04L 1/0026 375/299 |
| 2008/0304463 A1* | 12/2008 | Borkar | H04B 7/0417 370/342 |
| 2009/0034427 A1 | 2/2009 | Sohn et al. | |
| 2009/0046570 A1 | 2/2009 | Sarkar et al. | |
| 2009/0232245 A1* | 9/2009 | Lakkis | H04B 7/0491 375/267 |
| 2009/0262856 A1* | 10/2009 | Onggosanusi | H04B 7/0615 375/267 |
| 2010/0054196 A1* | 3/2010 | Hui | H04W 16/00 370/329 |
| 2010/0231442 A1* | 9/2010 | Craig | H04B 7/18515 342/354 |
| 2010/0238912 A1 | 9/2010 | Merlin et al. | |
| 2010/0323612 A1 | 12/2010 | Xu et al. | |
| 2011/0149765 A1 | 6/2011 | Gorokhov et al. | |
| 2011/0268007 A1 | 11/2011 | Barany et al. | |
| 2012/0147805 A1 | 6/2012 | Kim et al. | |

FOREIGN PATENT DOCUMENTS

| | | |
|---|---|---|
| WO | 2008114743 A1 | 5/2008 |
| WO | 2009023532 A2 | 2/2009 |

OTHER PUBLICATIONS

3rd Generation Partnership Project; Technical Specification Group Radio Access Network; Evolved Universal Terrestrial Radio Access (E-UTRA); Further Advancements for E-UTRA Physical Layer Aspects (Release 9), Technical Report, 3GPP TR 36.814 v9.0.0, Mar. 2010, 104 pages.

* cited by examiner

SYSTEM AND METHOD FOR DOWNLINK CHANNEL SOUNDING IN WIRELESS COMMUNICATIONS SYSTEMS

CROSS REFERENCE TO RELATED APPLICATIONS

This patent application is a continuation of U.S. Non-Provisional patent application Ser. No. 15/650,473 filed on Jul. 14, 2017, entitled "System and Method for Downlink Channel Sounding in Wireless Communications Systems," which is a continuation of U.S. Non-Provisional patent application Ser. No. 14/874,190 filed on Oct. 2, 2015, now U.S. Pat. No. 9,735,852, entitled "System and Method for Downlink Channel Sounding in Wireless Communications Systems," which is a continuation of U.S. Non-Provisional patent application Ser. No. 12/830,983 filed on Jul. 6, 2010, now U.S. Pat. No. 9,184,511, entitled "System and Method for Downlink Channel Sounding in Wireless Communications Systems," which claims priority to U.S. Provisional Application No. 61/224,737 filed on Jul. 10, 2009, entitled "System and Method for Downlink Channel Sounding in Wireless Communications Systems," all of which are incorporated by reference herein as if reproduced in their entireties.

TECHNICAL FIELD

The present application relates generally to wireless communications, and more particularly to a system and method for downlink (DL) channel sounding in wireless communications systems.

BACKGROUND

In coordinated multi-point (CoMP) transmission, transmissions from multiple enhanced Node Bs (eNBs) are made simultaneously to a single User Equipment (UE). Coordination of the transmissions made by the eNBs enable the UE to combine the transmissions to improve high data rate coverage and to increase system throughput in advanced wireless communications systems, such as Long Term Evolution-Advanced (LTE-A). eNBs may also be commonly referred to as base stations, base transceiver stations, controllers, access points, and so forth, while UEs may also be commonly referred to as subscribers, subscriber stations, terminals, mobile stations, and so on.

In general, there are two different CoMP approaches: joint processing from multiple cells (eNBs) and coordinated scheduling/beamforming (CS/CB). In joint processing, there is an assumption that data is available at each transmission point (eNB) in a CoMP cooperating set representing eNBs participating in the CoMP transmission. The data may be transmitted from more than one eNB at a time with dynamic eNB selection when the data is transmitted from only one eNB at a time. In CS/CB, the data may only be available at a serving eNB and transmission scheduling is coordinated among eNBs within the CoMP cooperating set.

In order to further help achieve better channel utilization and increase overall system performance, channel state/statistics/information about a downlink (DL) channel(s) between an eNB and a UE may be provided by the UE to the eNB. The channel state/statistics/information provided by the UE enables the eNB to adjust its transmitter to more effectively make use of the DL channel(s) condition.

In general, there may be two types of channel state/statistics/information feedback scheme for LTE-A: explicit channel state/statistics/information feedback and implicit channel state/statistics/information feedback. In explicit feedback, an eNB determines the CoMP transmission processing matrix based on the whole or major part of the CoMP channel information, and therefore better CoMP performance can be obtained at the expense of high feedback overhead. With explicit feedback, more information may be provided to the eNB to afford the eNB greater flexibility in scheduling CoMP transmissions. If precoded DL reference signals are used, a selected CoMP transmission scheme may be transparent to the UE. However, uplink (UL) feedback overhead may be high when instantaneous channel information feedback is required.

In implicit feedback, an eNB determines the CoMP transmission processing matrix based on precoding matrix indication (PMI)/rank indication (RI) recommended by UE. For non-coherent multi-point CoMP transmission, only disjoint PMI/RI information (or individual PMI for cells in CoMP cooperation set) is required, while for coherent multi-point CoMP transmission, joint PMI/RI feedback which contains individual PMI/RI information and additional inter-cell spatial information or a single joint PMI/RI information is required. Usually joint PMI/RI feedback demands more feedback overhead than disjoint PMI/RI feedback. With implicit feedback, the UE feedback channel information based on certain transmit or receive processing and incurs less feedback overhead. However, this may come at decreased scheduling flexibility.

Therefore, channel state/statistics/information feedback should be able to provide the eNBs with a high degree of control and flexibility with a reasonable UL feedback overhead. Feedback schemes that use non pure-codebook based precoding to provide the eNBs the flexibility to determine the CoMP transmission scheme are desirable. Additionally, the feedback schemes should allow the eNBs to override recommendations from the UEs. For example, in a situation where transparent CoMP transmission with the assistance of a precoded demodulation pilot.

Additionally, LTE-A is capable of supporting advanced forms of multiple input, multiple output (MIMO), such as single user MIMO (SU-MIMO) or multi-user MIMO (MU-MIMO). For example, in SU-MIMO and MU-MIMO may utilize precoding with more than four (4) transmit antennas. The more advanced forms of MIMO may require more accurate tuning of a transmit beam and/or closed-loop (CL) spatial channel to allow for the support of a variety of antenna configurations and propagation scenarios. A LTE Release-8 pure precoding matrix indication (PMI) report based on frequency division duplexing (FDD) DL channel sounding scheme may not provide adequate information. This may be due to the increased difficulty in designing a codebook for higher-order MIMO. Furthermore, more PMI feedback overhead may be needed to fully exploit the benefits of higher-order MIMO and MU-MIMO.

SUMMARY OF THE INVENTION

These and other problems are generally solved or circumvented, and technical advantages are generally achieved, by embodiments of a system and method for downlink (DL) channel sounding in wireless communications systems.

According to an embodiment, a user equipment (UE) configured to communicate wirelessly in a wireless network is provided. The UE includes a processor and a non-transitory computer readable storage medium storing programming for execution by the processor. The programming includes instructions to receive multiple reference signals transmitted over different beam directions from a base station, and report channel state information to the BS based on channel measurements of the multiple reference signals. The channel state information comprises at least one index of at least one of the multiple reference signals. The at least one index is used to indicate at least one beam direction over which the at least one of the multiple reference signals are transmitted. The programming further includes instructions to receive, from the BS, at least one data signal transmitted over the at least one beam direction indicated by the at least one index. In one example, at least one channel measurement value of the at least one of the multiple reference signals satisfies a channel measurement requirement for reporting. In the same example, or in another example, the channel state information further comprises at least one channel measurement value of the at least one of the multiple reference signals. In any one of the preceding examples, or in another example, the at least one index is related to resource information of at least one resource configured to transmit the at least one of the multiple reference signals. In any one of the preceding examples, or in another example, at least one index comprises one index of a reference signal having a highest channel measurement value or two indexes of reference signals having the highest channel measurement value and a lowest channel measurement value.

In another embodiment, a method of operating a user equipment (UE) configured to communicate wirelessly in a wireless network. In this embodiment, the method includes receiving multiple reference signals transmitted over different beam directions from a base station (BS), and reporting channel state information to the BS, based on channel measurement of the multiple reference signals. The channel state information comprises at least one index of at least one of the multiple reference signals. The at least one index is used to indicate at least one beam direction over which the at least one of the multiple reference signals are transmitted. The method further includes receiving at least one data signal transmitted over the at least one beam direction indicated by the at least one index from the BS. In one example, at least one channel measurement value of the at least one of the multiple reference signals satisfies a channel measurement requirement for reporting. In the same example, or in another example, the channel state information further comprises at least one channel measurement value of the at least one of the multiple reference signals. In any one of the preceding examples, or in another example, the at least one index is related to resource information of at least one resource configured to transmit the at least one of the multiple reference signals. In any one of the preceding examples, or in another example, at least one index comprises one index of a reference signal having a highest channel measurement value or two indexes of reference signals having the highest channel measurement value and a lowest channel measurement value. A computer program product and a non-transitory computer-readable medium storing a program for performing this method are also provided.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments are discussed in detail below. It should be appreciated, however, that the present application provides many applicable inventive concepts that can be embodied in a wide variety of specific contexts. The specific embodiments discussed are merely illustrative of specific ways to make and use the application, and do not limit the scope of the application.

Traditionally, CoMP transmission is only considered for access link (a wireless link between an eNB (or relay node (RN)) and a UE) operation to improve the coverage of the UE. However, CoMP transmission may also be applied to backhaul link (a wireless link between an eNB and a RN) operation to enhance the coverage of the RN.

In a communications system with RNs, layered CoMP transmissions may be applied to backhaul links as well as access links. With a backhaul CoMP transmission, a RN may receive/transmit data from/to more than one eNB at a time, as long as data is available in more than one eNB to allow for joint transmissions or coordinated transmission to a certain RN to enable inexpensive RN deployment. Backhaul CoMP transmissions may also be a way to control inter-cell interference. With access link CoMP transmission, a UE can receive/transmit data from/to more than one RNs or eNBs, with the possibility of multiple access link CoMP transmissions for multi-hop RNs.

Both backhaul CoMP transmissions and access link CoMP transmissions may be configured separately or jointly. When configured jointly, this may be referred to as concatenated CoMP transmission. With separate configuration, it may be possible to utilize different CoMP transmission technologies as well as feedback schemes in each CoMP transmission layer. A RN may act as both a CoMP transmission transmit point and/or a CoMP transmission receive point.

Figure 1:
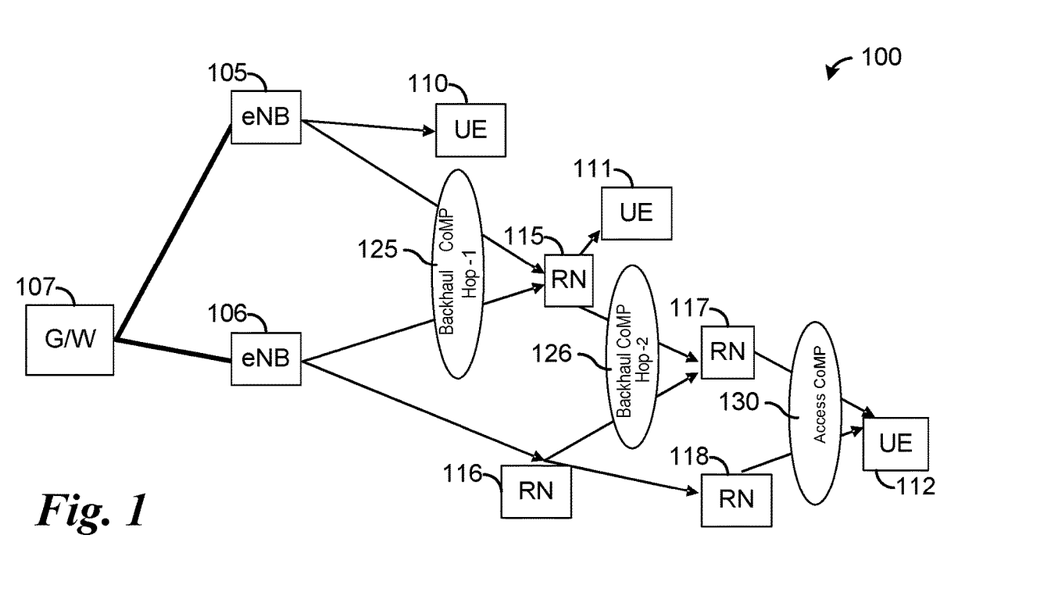
FIG. 1 is a diagram of a communications system.

FIG. 1 illustrates a communications system 100. Communications system 100 includes a number of eNBs, such as eNB 105 and eNB 106, that may be connected to a gateway (G/W) 107 over a wired backhaul. The eNBs may serve a number of UEs, such as UE 110, UE 111, and UE 112. Transmissions from the eNBs to the UEs may occur directly, such as from eNB 105 to UE 110, or indirectly, such as through a relay node (RN), including RN 115, RN 116, RN 117, and RN 118. For example, an indirect transmission may occur through a single RN, such as a transmission from eNB 105 to UE 111 through RN 115, or through more than one RNs, such as a transmission from eNB 106 to UE 112 through RN 116 and RN 118.

A RN may be used to relay transmissions made by an eNB to a UE or a UE to an eNB. The use of the RN may increase the coverage area of the eNB. As discussed previously, CoMP transmission has been proposed to increase the coverage of a UE by allowing transmissions from multiple eNBs to be made simultaneously to the UE, commonly referred to as an access link. However, CoMP transmission may also be used to increase the coverage of a RN by allowing transmissions from multiple eNBs or RNs to be made simultaneously to a the RN, commonly referred to as a backhaul link.

As shown in FIG. 1, a first backhaul CoMP transmission from eNB 105 and eNB 106 may be made to RN 115 (shown as backhaul CoMP hop-1 125) and a second backhaul CoMP transmission from RN 115 and RN 116 may be made to RN 117 (shown as backhaul CoMP hop-2 126). While an access link CoMP transmission from RN 117 and RN 118 may be made to UE 112 (shown as access CoMP 130).

In LTE-A, the use of UE specific demodulation reference signal makes transparent DL transmission possible. With the UE specific demodulation reference signal, an eNB does not need to signal the transmission mode/processing since the same transmission mode/processing is applied to both the data and the UE specific demodulation reference signal. This may allow the eNB greater freedom in the selection of the transmission mode, i.e., more scheduling flexibility.

However, in order for the eNB to determine the transmission mode, enough channel information should be available to the eNB in order for the eNB to make a decision. With explicit channel (H) feedback, the eNB obtains the entirety of the channel information. However, the feedback overhead is very high, especially for higher-order MIMO, MU-MIMO, and CoMP transmission. With implicit channel feedback, such as PMI feedback, the eNB has to rely on the recommendation of the UE(s), which may restrict some of the scheduling available at the eNB.

DL precoded common sounding reference signal (PC-SRS) based channel sounding can be applied to CoMP channel sounding. DL PCSRS is eNB oriented, with the eNB configuring the precoding matrix adaptively according to deployment environment, such as antenna configuration, neighboring eNBs available for CoMP transmission, propagation scenario, UE distribution, and so forth. The sounding reference signal occupies DL channel resources, therefore, less UL channel resources are required. Transparent DL channel sounding allows for the true transparent non-codebook based precoding on the UE side with simple UE implementation that does not require codebook searches or feedback.

Figure 2A:
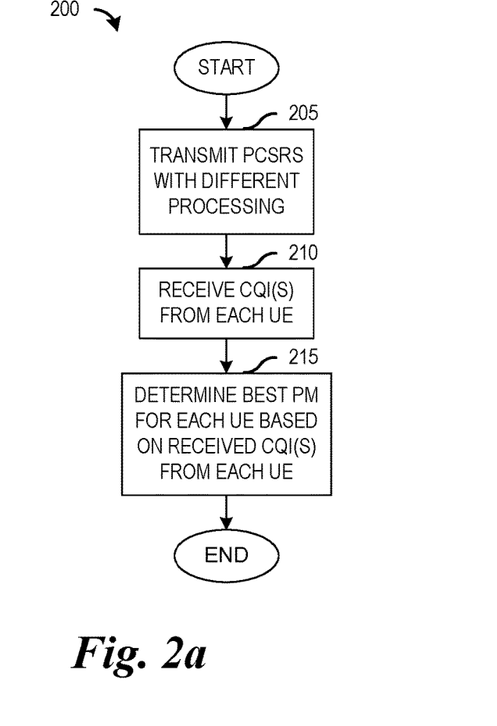
FIG. 2a is a flow diagram of eNB operations in DL transparent channel sounding.

FIG. 2a illustrates a flow diagram of eNB operations 200 in DL transparent channel sounding. eNB operations 200 may be indicative of operations taking place in an eNB, such as eNB 105, performing DL transparent channel sounding to obtain feedback information to schedule CoMP transmissions.

eNB operations 200 may begin with the eNB transmitting a common sounding reference signal that has been precoded with different processing (block 205). The eNB may transmit the precoded common sounding reference signals (PC-SRS) periodically. The precoding may be based on certain predefined matrices selected by the eNB with the predefined matrices being environment or antenna configuration dependent. Alternatively, the precoding may be based on an initial full channel feedback provided by UE(s).

The resource elements over which the PCSRS are transmitted may be located at predefined locations, to simplify UE detection. For example, the PCSRS corresponding to different precoding matrices may be transmitted cyclically according to a predefined pattern in time and frequency. They may be carried by certain LTE-A physical resource block (PRB), for example, and information regarding the location of the PRB as well as the cyclic pattern of the PCSRS may be broadcasted to all UEs. The eNB may also precode the PCSRS with a non-CoMP transmission precoding matrix (from a single cell) or a joint CoMP transmission precoding matrix (from multiple cells) to serve cell edge UEs or enable MU-MIMO transmission. The precoding is transparent to the cell edge UEs.

The eNB may then receive CQI(s) from each UE (block 210). The UEs measure the channel based on the PCSRS and reports the highest CQI or a specified number of the highest CQIs corresponding to certain precoding processing. The UEs do not need to know the precoding used in the PCSRS. The UEs link the CQI with the corresponding precoding by including a PCSRS index in its report of the CQI. For example, the UEs may report the location of the PRB used to receive the PCSRS or the cyclic pattern of the PCSRS.

The eNB may determine the best precoding matrix for each UE based on the reported CQI(s) (block 215). From the reported CQI(s) and the PCSRS indices from the different UEs, the eNB may be able to determine the best precoding matrix for each UE. For example, the eNB finds the best precoding index for a UE based on a one-to-one relationship between the precoding matrix index and the CQI index. The CQI information may also be used by the eNB for the selection of a modulation and coding scheme (MCS) if the corresponding precoding matrix is applied. eNB operations 200 may then terminate. The information about the best precoding matrix and the corresponding CQI value may also be used by eNB to schedule MU-MIMO transmission.

Figure 2B:
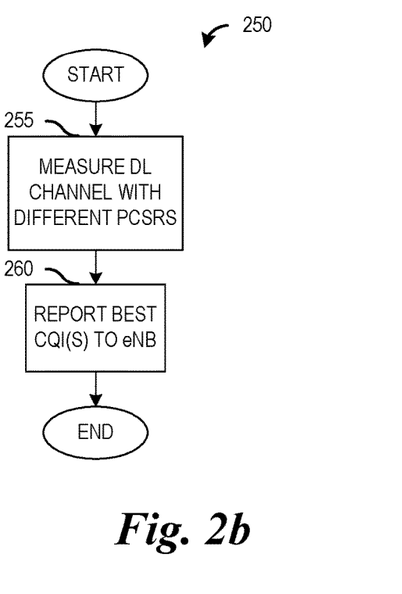
FIG. 2b is a flow diagram of UE operations in DL transparent channel sounding.

FIG. 2b illustrates a flow diagram of UE operations 250 in DL transparent channel sounding. UE operations 250 may be indicative of operations taking place in a UE, such as UE 110, participating in DL transparent channel sounding to provide feedback information to an eNB, such as eNB 105, so that the eNB can schedule CoMP transmissions.

UE operations 250 may begin with the UE measuring a downlink channel using the PCSRS transmitted by the eNB (block 255) and transmits the highest CQI or a specified number of the highest CQIs to the eNB (block 260). The UE knows where to make the measurements using the location of the PRBs or cyclic patterns broadcast by the eNB. The UE does not need to know the precoding used in the PCSRS and links the CQI (the measurement) with a corresponding precoding by including a PCSRS index in its report to the eNB. UE operations 250 may then terminate.

In order to optimize closed-loop (CL) performance for CoMP transmission and advanced MIMO, sufficient spatial granularity may be required. For UEs with medium to high mobility or for a situation with high correlated antennas, the spatial resolution requirement may be relatively low since it is very difficult to track a narrow beam direction. However, rough (or coarse) beamforming may still provide a measure of CL gain when compared with open-loop (OL) transmission. This may be especially true for CoMP transmission when compared with OL CoMP transmission. Lower spatial resolution means fewer hypotheses and lower PCSRS overhead.

For low mobility UEs, a higher spatial resolution may be required since it is possible to fine tune the beamformed beam. As an inverse to lower spatial resolution, higher spatial resolution means more hypotheses and higher sounding DL reference sequences. An efficient DL sounding approach that enables a fast CL beamforming adaptation with reasonable DL sounding overhead is needed. Two possible solutions exist: iterative sounding and differential PMI feedback.

Figure 3A:
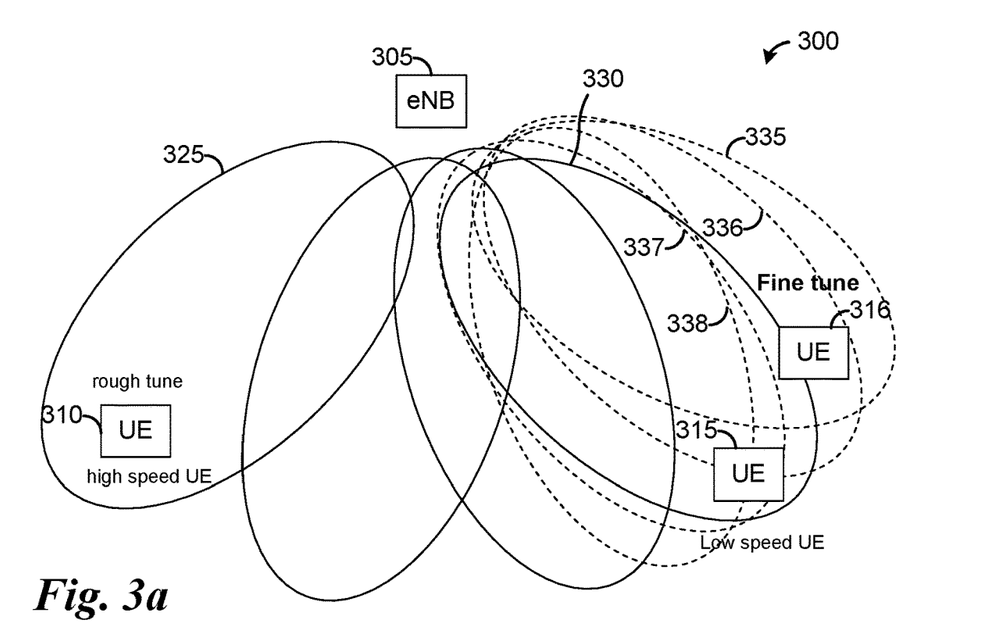
FIG. 3a is a diagram of iterative PCSRS based DL channel sounding in advanced MIMO.

FIG. 3a illustrates a diagram 300 of iterative PCSRS based DL channel sounding in advanced MIMO. Diagram 300 illustrates a portion of a communications system comprising an eNB 305 and a number of UEs, such as UE 310, UE 315, and UE 316. UE 310 may be a UE with high mobility, while UE 315 and UE 316 may be UEs with low mobility.

Iterative PCSRS may be applied to speed up the polling procedure for low mobility UEs during sounding. Iterative PCSRS consists of rough tuning and fine tuning to reduce an overall number of hypotheses. Fine tuning may be performed about a beam direction found in rough tuning. This decreases PCSRS overhead and allows for fast CL adaptation.

eNB 305 transmits a number of rough tuning PCSRS precoded with processing matrices which separates the PCSRS roughly equally in space (shown as solid ovals 325 and 330). The UEs measure the rough tuning PCSRS and report back CQI(s), from which eNB 305 determines that a rough tuning PCSRS corresponding to oval 325 is reported as highest CQI for UE 310. Similarly, for UEs 315 and 316, a rough tuning PCSRS corresponding to oval 330 is reported as highest CQI. Since UE 310 is a high mobility UE, eNB 305 may not attempt to fine tune to increase spatial resolution. However, UEs 315 and 316 are low mobility UEs, therefore, eNB 305 may increase spatial resolution through fine tuning.

eNB 305 may achieve fine tuning by transmitting fine tuning PCSRS precoding with processing matrices which separates the fine tuning PCSRS about equally in space within a region encompassed by rough tuning PCSRS corresponding to oval 330 (shown as dotted ovals 335-338). The UEs (UEs 315 and 316) again measure the fine tuning PCSRS and report back the CQI(s), from which eNB 305 determines the fine tuning PCSRS corresponding to the reported CQI(s) from the UEs.

Although shown to be a two-step process (rough tuning followed by fine tuning), the fine tuning may be performed in several steps, with each step obtaining greater and greater spatial resolution. In practice, the number of fine tuning steps may be limited by factors such as the mobility of the UEs, the amount of time (and other resources) that can be dedicated to the fine tuning, and so forth.

Figure 3B:
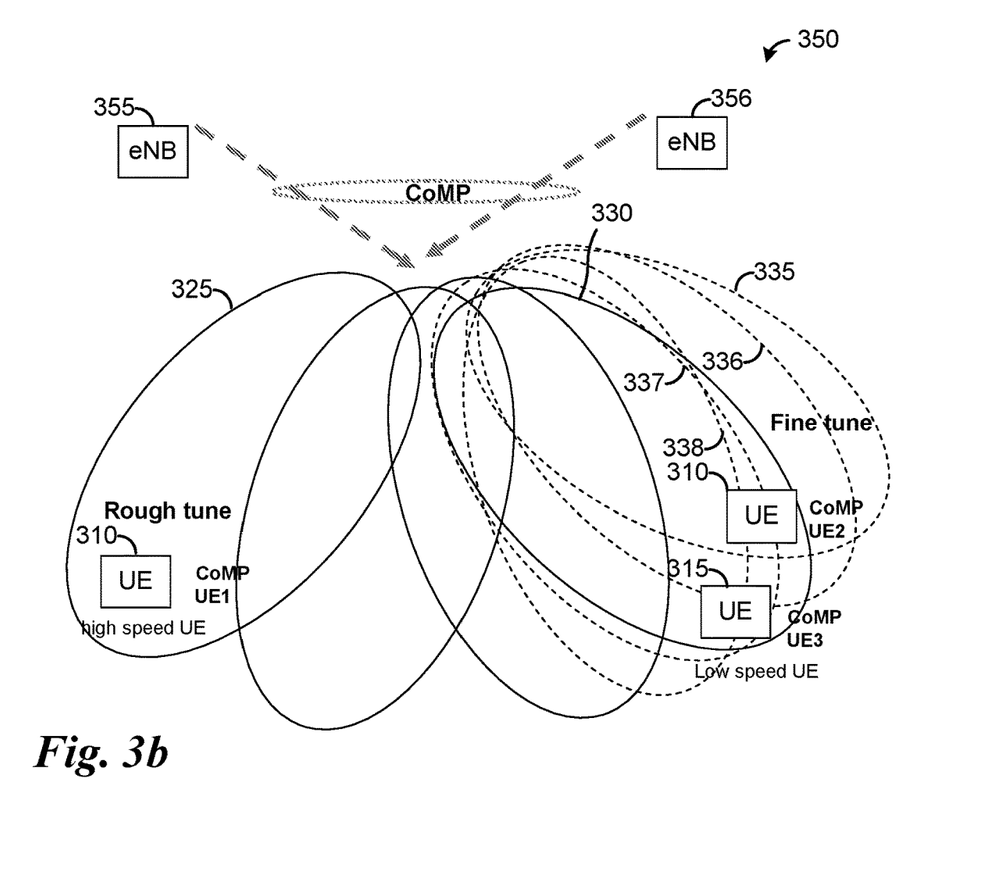
FIG. 3b is a diagram of iterative PCSRS based DL channel sounding in CoMP transmission.

FIG. 3b illustrates a diagram 350 of iterative PCSRS based DL channel sounding in CoMP transmission. As shown in FIG. 3b, diagram 350 is similar to diagram 30000 and the iterative PCSRS based DL channel sounding in CoMP transmission is substantially similar to the iterative PCSRS based DL channel sounding in advanced MIMO. A difference being that more than one eNB (eNBs 355 and 356 in FIG. 3b) are used to transmit the PCSRS.

Figure 4A:
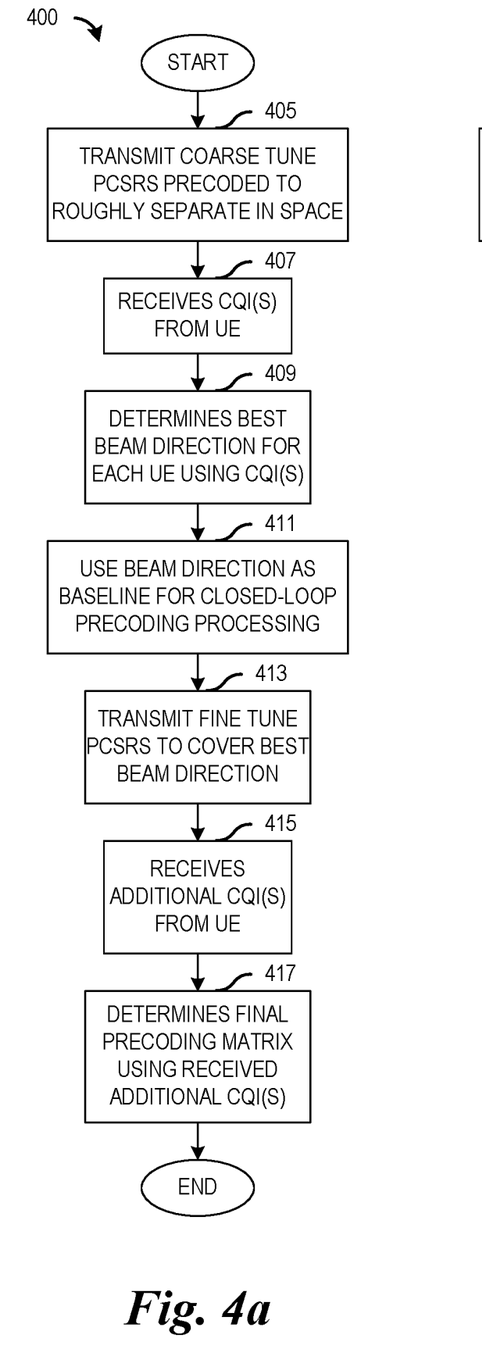
FIG. 4a is a flow diagram of eNB operations in PCSRS based DL channel sounding in CoMP transmission.

FIG. 4a illustrates a flow diagram of eNB operations 400 in PCSRS based DL channel sounding in CoMP transmission. eNB operations 400 may be indicative of operations taking place in an eNB, such as eNB 105, performing PCSRS based DL channel sounding to obtain feedback information to schedule CoMP transmissions.

eNB operations 400 may begin with the eNB transmitting rough tuning PCSRS that are precoded with processing matrices that separate the rough tuning PCSRS roughly equally space, rough beams allow for identification with less spatial granularity (block 405). The eNB may then receive CQI reports from the UEs, wherein the UEs have performed channel measurements of the rough tuning PCSRS and selected the strongest CQI (or a specified number of the strongest CQI) and reported them back to the eNB (block 407). The reported CQI(s) correspond to a particular precoding matrix and corresponding PCSRS index.

From the reported CQI, the eNB may determine the best PCSRS (and hence the best beam direction) for each UE (block 409). The eNB may use the beam direction as a baseline for CL precoding processing (block 411). The beam direction may also be used as a fall back for precoding processing when the eNB needs to override the recommendations of the UEs, for example.

The eNB may then transmit fine tuning PCSRS that have been precoded with processing matrices that covers a region covered by the rough tuning PCSRS selected by the UEs (block 413). If there are more than one rough tuning PCSRS to fine tune, each of the additional rough tuning PCSRS may be fine tuned one at a time with additional fine tuning PCSRS. The eNB may then receive CQI reports from the UEs, wherein the UEs have performed channel measurements of the fine tuning PCSRS and selected the strongest CQI (or a specified number of the strongest CQI) and reported them back to the eNB (block 415). The fine tuning PCSRS are transmitted to the low mobility UEs. The eNB may identify the low mobility UEs that need additional fine tuning and informs the UEs or the UE in CL mode knows that it is in need of fine tuning. The reported CQI(s) correspond to a particular precoding matrix and corresponding PCSRS index. From the reported CQI, the eNB may determine the best fine tuning PCSRS (and hence the best beam direction) for each UE (block 417) and eNB operations 400 may terminate.

As discussed previously, if there are multiple rough tuning PCSRS to fine tune, then the eNB may repeat the transmission of fine tuning PCSRS for each of the rough tuning PCSRS (with the fine tuning PCSRS being specifically designed for each of the rough tuning PCSRS). Furthermore, the fine tuning step may be performed multiple times to obtain a progressively finer and finer spatial resolution.

Figure 4B:
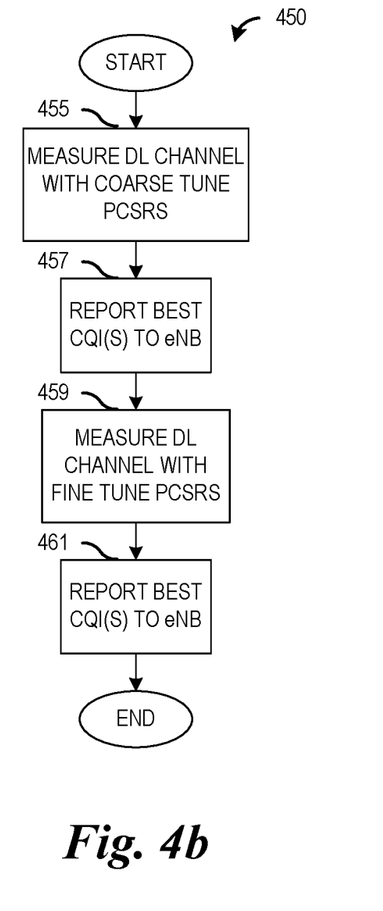
FIG. 4b is a flow diagram of UE operations in PCSRS based DL channel sounding in CoMP transmission.

FIG. 4b illustrates a flow diagram of UE operations 450 in PCSRS based DL channel sounding in CoMP transmission. UE operations 450 may be indicative of operations taking place in a UE, such as UE 110, participating in PCSRS based DL channel sounding to provide feedback information to an eNB, such as eNB 105, so that the eNB can schedule CoMP transmissions.

UE operations 450 may begin with the UE measuring a downlink channel using the coarse tuning PCSRS transmitted by the eNB (block 455). The UE may then report the highest measured CQI or a specified number of highest CQI (block 457). UE operations 450 may continue with the UE measuring the downlink channel using the fine tuning PCSRS transmitted by the eNB (block 459). The UE may then report the highest measured CQI or a specified number of highest CQI (block 461) and UE operations 450 may terminate.

If there are several PCSRS that have the same highest measured CQI, then the UE may report all of the indices. Alternatively, the UE may select a specified number of the indices to report. Alternatively, the UE may select one index to report. The selection of the index (or indices) may be performed at random, based on eNB operating conditions (load, number of UEs served, UE priority, and so forth).

As discussed previously, not all UEs will participate in the measurement of the downlink channel with the fine tuning PCSRS. The UEs may receive indications from the eNB indicating that they are to participate in the fine tune step. Alternatively, the UEs may be operating in CL mode and know that they are to participate in the fine tune step.

Differential PMI feedback combines PMI feedback with PCSRS DL channel sounding. A differential codebook may be applied to reduce the PMI feedback overhead since a smaller codebook may be used. Furthermore, the differential codebook may be used to enhance the spatial resolution of a base codebook with the same codebook size, which reduces the codebook search space. Additionally, the differential codebook may be used to trace the change of the channel as a reference for the differential codebook search being a precoded demodulation reference sequence carried by a data channel.

Figure 5A:
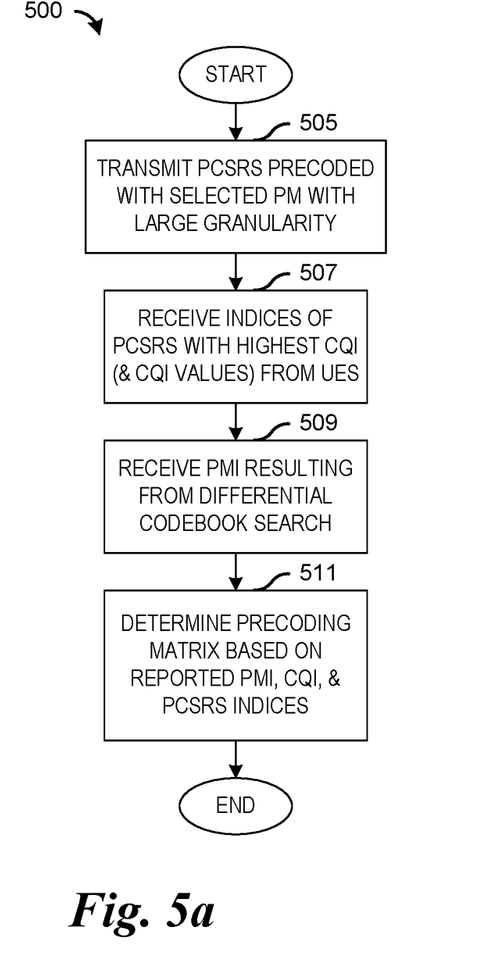
FIG. 5a is a flow diagram of eNB operations in PCSRS based differential codebook feedback.

FIG. 5a illustrates a flow diagram of eNB operations 500 in PCSRS based differential codebook feedback. eNB operations 500 may be indicative of operations taking place in an eNB, such as eNB 105, performing PCSRS based differential codebook feedback to obtain feedback information to schedule CoMP transmissions.

eNB operations 500 may begin with the eNB initiating an initial channel sounding by sending PCSRS precoded with eNB selected precoding matrices (block 505). According to a preferred embodiment, the precoding matrices are selected with large granularity. The eNB may then receive indices of PCSRS having highest measured CQI as well as the CQI value itself from the UEs (block 507).

In addition to the PCSRS indices and CQI, the eNB also receives a PMI from a differential codebook search performed by the UEs (block 509). The eNB then determines a precoding matrix based on the reported PMI and the received PCSRS index and CQI (block 511). The eNB may use the reported PCSRS from the UEs to verify the PMI feedback and eNB operations 500 may terminate.

The eNB may be able to override the PMI recommendation from the UEs (block 509) with a precoding matrix that it computes on its own from the PCSRS indices and CQI received from the UEs.

Figure 5B:
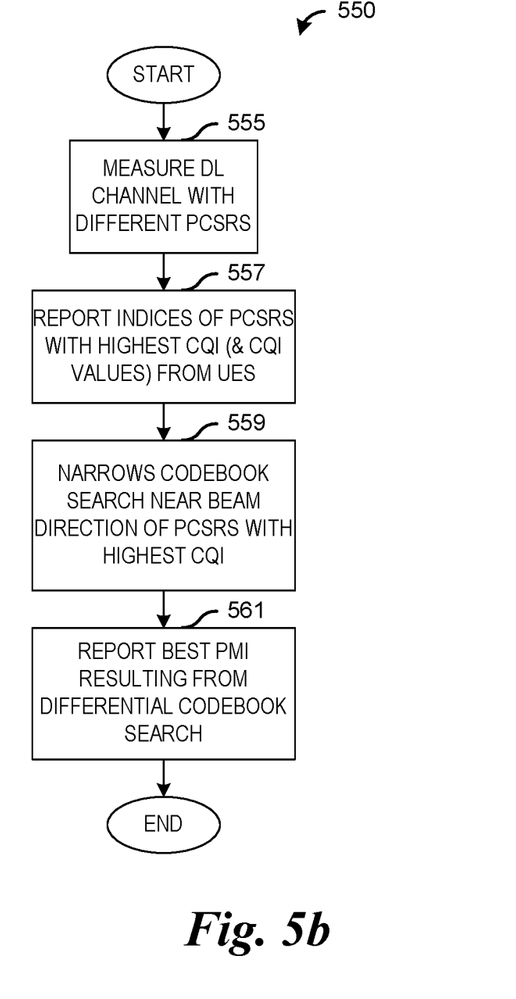
FIG. 5b is a flow diagram of UE operations in PCSRS based differential codebook feedback.

FIG. 5b illustrates a flow diagram of UE operations 550 in PCSRS based differential codebook feedback. UE operations 550 may be indicative of operations taking place in a UE, such as UE 110, participating in PCSRS based differential codebook feedback to provide feedback information to an eNB, such as eNB 105, so that the eNB can schedule CoMP transmissions.

UE operations 550 may begin with the UE measuring a DL channel using the PCSRS transmitted by the eNB, wherein the PCSRS have been precoded with precoding matrices, wherein the precoding matrices have large granularity (block 555). The UE may report an index of a PCSRS corresponding to a highest measured CQI to the eNB (block 557). In addition to the index of the PCSRS, the UE may also report the highest measured CQI value.

The UE may also narrow down the codebook search by performing a differential codebook search along a direction of the PCSRS having the highest measured CQI (block 559). The PCSRS that resulted in the highest measured CQI may be used by the UE as a reference in the differential codebook search. In some scenarios, only UEs participating in CoMP transmissions need to perform the differential codebook search, wherein the UEs are based on DL signaling or a present CQI threshold. In other scenarios, UEs not participating in CoMP transmission may also need to perform the differential codebook search to provide more precise precoding information for MU-MIMO transmission. The UE reports to the eNB a best PMI from the differential codebook search (block 561) and UE operations 550 may then terminate.

If there are several PCSRS that have the same highest measured CQI, then the UE may report all of the indices. Alternatively, the UE may select a specified number of the indices to report. Alternatively, the UE may select one index to report. The selection of the index (or indices) may be performed at random, based on eNB operating conditions (load, number of UEs served, UE priority, and so forth).

Figure 6:
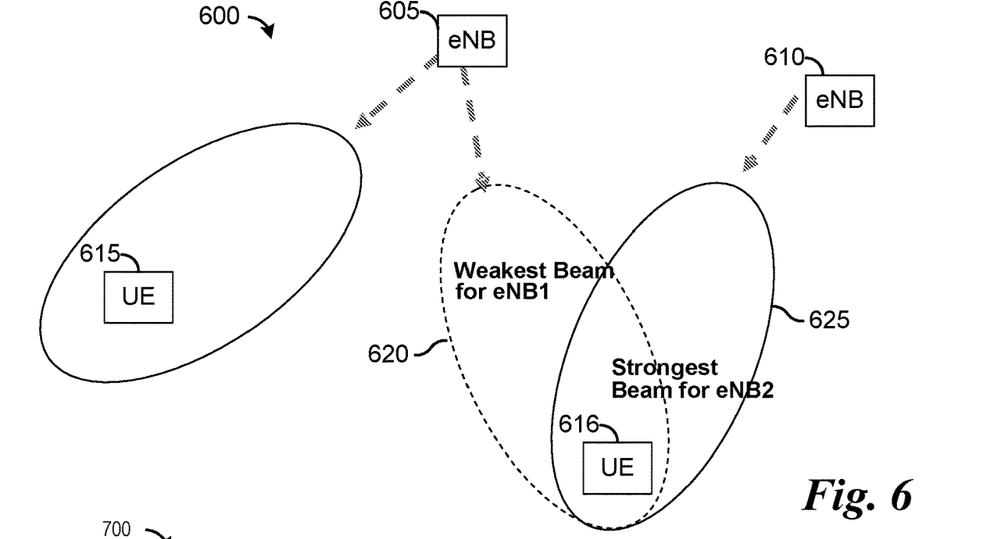
FIG. 6 is a diagram of PCSRS based channel sounding for CS/CB.

FIG. 6 illustrates a diagram 600 of PCSRS based channel sounding for CS/CB. Diagram 600 illustrates a portion of a communications system comprising a first eNB 605 and a second eNB 610. First eNB 605 may be serving UE 615 and UE 616, while second eNB 610 serves UE 616. First eNB 605 and second eNB 610 may be using CoMP transmission to serve UE 616.

Based on measurements of PCSRS precoded with different precoding matrices transmitted by first eNB 605 and second eNB 610, UE 616 may report back to both eNBs PCSRS indices corresponding to highest measured CQI or both highest and lowest measured CQI. In other words, UE 616 reports back to the eNBs the strongest and weakest beam directions. For example, dashed oval 620 may represent a weakest beam direction for first eNB 605 and solid oval 625 may represent a strongest beam direction for second eNB 610. Using the information provided by the UEs, the eNBs can schedule transmissions to its own UEs. For example, knowing the strongest beam direction for first eNB 605, second eNB 6100 may schedule transmissions to its own UEs in the same beam direction at the same time that first eNB 605 is transmitting to its UEs in the strongest beam direction.

Figure 7A:
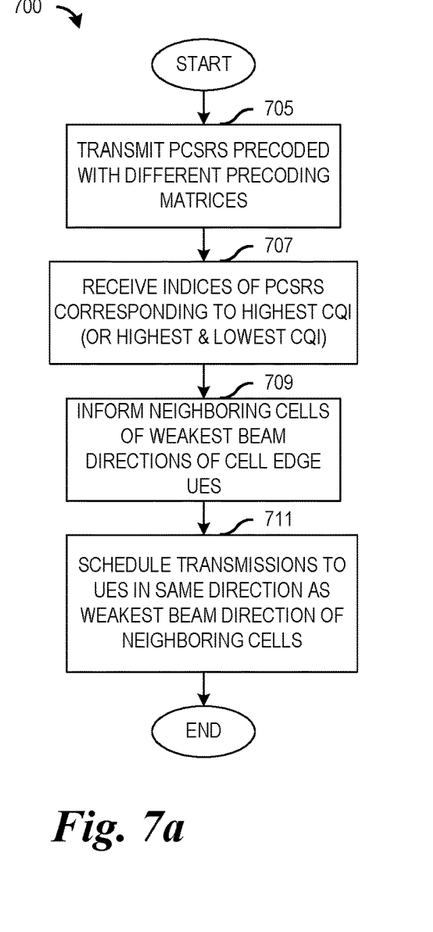
FIG. 7a is a flow diagram of eNB operations in PCSRS based DL channel sounding for CS/CB.

FIG. 7a illustrates a flow diagram of eNB operations 700 in PCSRS based DL channel sounding for CS/CB. eNB operations 700 may be indicative of operations taking place in an eNB, such as eNB 105, performing PCSRS based DL channel sounding for CS/CB.

eNB operations 700 may begin with the eNB transmitting PCSRS precoded with different precoding matrices (block 705). The eNB may then receive an index of PCSRS corresponding to PCSRS having highest measured CQI or indices of PCSRS having highest and lowest measured CQI (block 707). The eNB may inform its neighboring cells (eNBs) of weakest beam directions of its cell edge UEs (block 709). The eNB may schedule transmission to UEs in same beam direction as weakest beam direction of neighboring cells (block 711) and eNB operations 700 may then terminate.

Figure 7B:
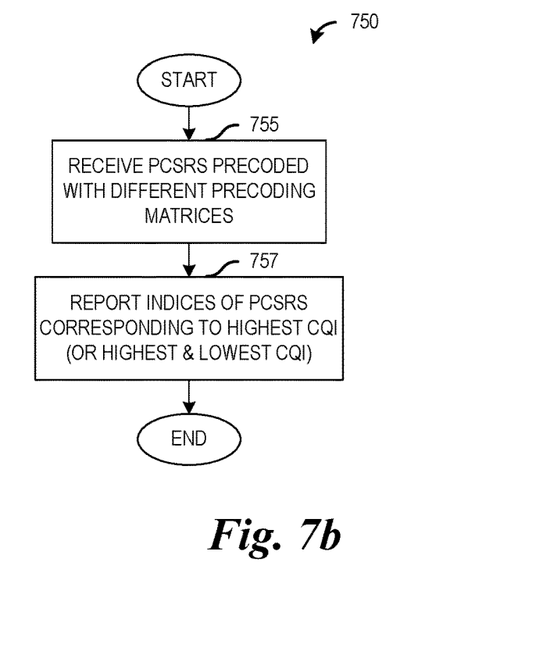
FIG. 7b is a flow diagram of UE operations in PCSRS based DL channel sounding for CS/CB.
Figure 8:
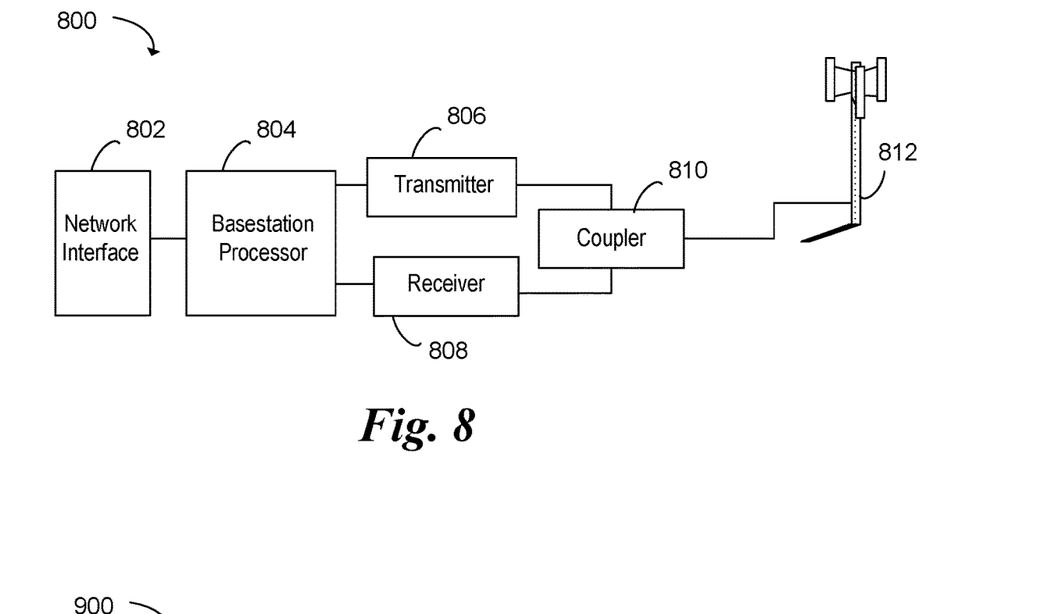
FIG. 8 illustrates a block diagram of an embodiment base station.
Figure 9:
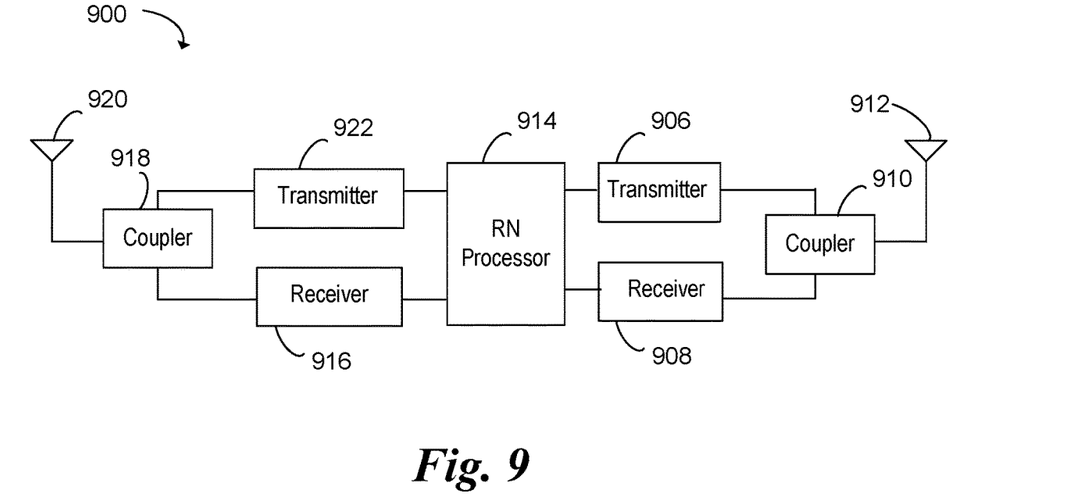
FIG. 9 illustrates a block diagram of an embodiment relay node.
Figure 10:
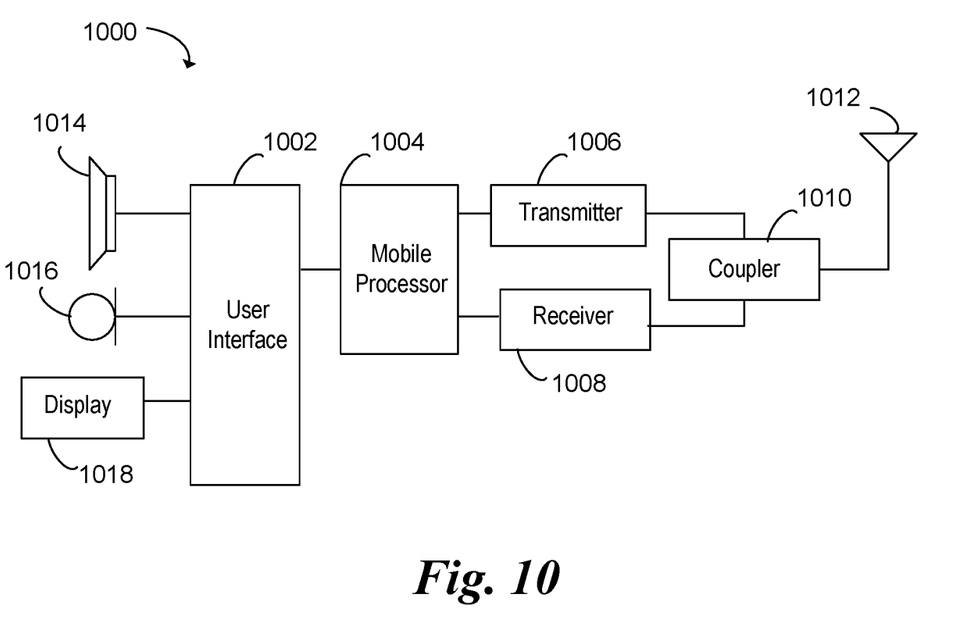
FIG. 10 illustrates a block diagram of an embodiment user device.

FIG. 7b illustrates a flow diagram of UE operations 750 in PCSRS based DL channel sounding for CS/CB. UE operations 750 may be indicative of operations taking place in a UE, such as UE 110, participating in PCSRS based DL channel sounding for CS/CB.

UE operations 750 may begin with the UE measuring a DL channel using the PCSRS transmitted by the eNB (block 755). The UE may report either an index of a PCSRS having highest measured CQI or indices of PCSRS having highest measured CQI and lowest measured CQI (block 757) and UE operations 750 may then terminate.

If there are several PCSRS that have the same highest (or lowest) measured CQI, then the UE may report all of the indices. Alternatively, the UE may select a specified number of the indices to report. Alternatively, the UE may select one index to report. The selection of the index (or indices) may be performed at random, based on eNB operating conditions (load, number of UEs served, UE priority, and so forth).

There may be different CoMP transmission feedback schemes for backhaul CoMP transmission and access link CoMP transmission. For example, an explicit feedback scheme may be used for backhaul CoMP transmission. With backhaul CoMP transmissions fixed RNs, the explicit feedback scheme may have an acceptable level of UL feedback overhead.

A hybrid DL channel sounding scheme may be used for access link CoMP transmission. The hybrid DL channel sounding scheme may include both explicit and implicit DL channel sounding. The explicit DL channel sounding may be performed as an initial DL channel sounding, with the UEs feeding back information regarding the DL channel to the serving eNB. For CoMP transmission, the UE feeds back the DL channel to the neighboring eNBs as well. The implicit channel sounding may be used to keep track of changes in the DL channel. Additionally, an explicit feedback scheme may be used for fixed UEs, while a PCSRS based feedback scheme may be used for UEs that are mobile (low/medium/high mobility). The PCSRS based feedback scheme may use non-adaptive PCSRS based sounding for medium and high mobility UEs and adaptive PCSRS based sounding and PCSRS based differential codebook feedback for low mobility UEs.

Furthermore, hybrid DL channel sounding schemes may be used for higher-order SU-MIMO or MU-MIMO (referred to collectively as higher-order MIMO). In higher-order MIMO systems, a non-adaptive technique, such as non-adaptive PCSRS based sounding, may be used for medium and high mobility UEs or for a situation with highly correlated antennas, while adaptive PCSRS based sounding may be used for low mobility UEs. In high-order MIMO systems with uncorrelated transmit antennas, a PCSRS based differential codebook feedback technique may be used.

Although the embodiments and their advantages have been described in detail, it should be understood that various changes, substitutions and alterations can be made herein without departing from the spirit and scope of the application as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present application, processes, machines, manufacture, compositions of matter, means, methods, or steps, presently existing or later to be developed, that perform substantially the same function or achieve substantially the same result as the corresponding embodiments described herein may be utilized according to the present application. Accordingly, the appended claims are intended to include within their scope such processes, machines, manufacture, compositions of matter, means, methods, or steps.

What is claimed is:

1. A user equipment (UE) configured to communicate wirelessly in a wireless network, the UE comprising:
   a processor; and
   a non-transitory computer readable storage medium storing programming for execution by the processor, the programming including instructions to:
   receive multiple reference signals transmitted over different beam directions from a base station (BS);
   transmit, to the BS, at least one index identifying at least one of the multiple reference signals received from the BS, the at least one index indicating at least one beam direction over which the at least one of the multiple reference signals are transmitted; and
   receive, from the BS, at least one data signal transmitted over at least one beam determined in accordance with the at least one index identifying the at least one of the reference signals.

2. The UE of claim 1, wherein at least one channel measurement value of the at least one of the multiple reference signals satisfies a channel measurement requirement for reporting.

3. The UE of claim 1, wherein the at least one index is comprised in channel state information reported to the BS, and the channel state information further comprises at least one channel measurement value of the at least one of the multiple reference signals.

4. The UE of claim 1, wherein the at least one index is related to resource information of at least one resource configured to transmit the at least one of the multiple reference signals.

5. The UE of claim 1, wherein at least one index comprises one index of a reference signal having a highest channel measurement value or two indexes of reference signals having the highest channel measurement value and a lowest channel measurement value.

6. A method of operating a user equipment (UE) configured to communicate wirelessly in a wireless network, the method comprising:
   receiving, by the UE, multiple reference signals transmitted over different beam directions from a base station (BS);
   transmitting, by the UE to the BS, at least one index identifying at least one of the multiple reference signals received from the BS, the at least one index indicating at least one beam direction over which the at least one of the multiple reference signals are transmitted; and
   receiving, by the UE from the BS, at least one data signal transmitted over at least one beam determined in accordance with the at least one index identifying the at least one of the reference signals.

7. The method of claim 6, wherein at least one channel measurement value of the at least one of the multiple reference signals satisfies a channel measurement requirement for reporting.

8. The method of claim 6, wherein the at least one index is comprised in channel state information reported to the BS, and the channel state information further comprises at least one channel measurement value of the at least one of the multiple reference signals.

9. The method of claim 6, wherein the at least one index is related to resource information of at least one resource configured to transmit the at least one of the multiple reference signals.

10. The method of claim 6, wherein at least one index comprises one index of a reference signal having a highest channel measurement value or two indexes of reference signals having the highest channel measurement value and a lowest channel measurement value.

11. A computer program product comprising computer executable instructions stored on a non-transitory computer-readable medium, wherein when executed by a processor, the instructions cause the processor to:
receive multiple reference signals transmitted over different beam directions from a base station (BS);
transmit, to the BS, at least one index uniquely identifying at least one of the multiple reference signals received from the BS, the at least one index indicating at least one beam direction over which the at least one of the multiple reference signals are transmitted; and
receive, from the BS, at least one data signal transmitted over at least one beam determined in accordance with the at least one index identifying the at least one of the reference signals.

12. The computer program product of claim 11, wherein the at least one of the multiple reference signals satisfies a channel measurement requirement.

13. The computer program product of claim 11, wherein the at least one index is comprised in channel state information reported to the BS, and the channel state information further comprises at least one channel measurement value of the at least one of the multiple reference signals.

14. The computer program product of claim 11, wherein the at least one index is related to resource information of at least one resource configured to transmit the at least one of the multiple reference signals.

15. The computer program product of claim 11, wherein at least one index comprises one index of a reference signal having a highest channel measurement value or two indexes of reference signals having the highest channel measurement value and a lowest channel measurement value.

16. A non-transitory computer-readable medium configured to store a computer program comprising instructions, wherein when executed by a processor, the instructions cause the processor to:
receive multiple reference signals transmitted over different beam directions from a base station (BS);
transmit, to the BS, at least one index identifying at least one of the multiple reference signals received from the BS, the at least one index indicating at least one beam direction over which the at least one of the multiple reference signals are transmitted; and
receive, from the BS, at least one data signal transmitted over at least one beam determined in accordance with the at least one index identifying the at least one of the reference signals.

17. The non-transitory computer-readable medium of claim 16, wherein at least one channel measurement value of the at least one of the multiple reference signals satisfies a channel measurement requirement for reporting.

18. The non-transitory computer-readable medium of claim 16, wherein the at least one index is comprised in channel state information reported to the BS, and the channel state information further comprises at least one channel measurement value of the at least one of the multiple reference signals.

19. The non-transitory computer-readable medium of claim 16, wherein the at least one index is related to resource information of at least one resource configured to transmit the at least one of the multiple reference signals.

20. The non-transitory computer-readable medium of claim 16, wherein at least one index comprises one index of a reference signal having a highest channel measurement value or two indexes of reference signals having the highest channel measurement value and a lowest channel measurement value.

* * * * *